April 21, 1936.  G. C. GOODE ET AL  2,037,778

INTERNAL COMBUSTION ENGINE

Filed Sept. 25, 1933

INVENTORS.
GILBERT C. GOODE
CLARENCE W. MILLER
GEORGE R. HARRINGTON.
ATTORNEYS.

Patented Apr. 21, 1936

2,037,778

UNITED STATES PATENT OFFICE 2,037,778

INTERNAL COMBUSTION ENGINE

Gilbert C. Goode, Birmingham, and Clarence W. Miller and George R. Harrington, Detroit, Mich., assignors to Chrysler Corporation, Detroit, Mich., a corporation of Delaware Application September 25, 1933, Serial No. 690,800

2 Claims. (Cl. 123—32)

This invention relates to internal combustion engines and more especially to the type in which a restricted passage or throat is provided between the compression chamber and the working portion of the cylinder, and in which the fuel is injected into air at high pressures and temperatures.

The main object of the invention is to improve the combustion in engines of this type.

Another object is to cause the injected fuel and air to flow in the same direction into the compression chamber.

Another object is to improve the mixture of air and fuel.

Another object is to reduce opposition to the discharge of fuel through the compression chamber.

Another object is to cause, on the return stroke of the piston of the engine, a high concentration of air in the compression chamber to be mixed with a high concentration of fuel at a point adjacent the throat joining the compression chamber and working portion of the cylinder.

Another object is to spray the fuel directly on the exhaust valve.

Another object is to arrange an exhaust valve so that it provides a wall of the compression chamber and reduces the flow of heat therefrom.

Another object is to avoid cooling the fuel due to projecting the same against cool walls.

Another object is to provide a compression chamber which conforms in shape closely to the fuel spray cone pattern.

A further object is to provide for a long spray cone in the compression chamber of a small bore engine.

Another object is to cause the last particles of fuel discharged from the injection nozzle to be exposed to ample amounts of air to give complete burning.

Another object is to cause the mixture of fuel and air to sweep past the discharge end of the injection nozzle as combustion takes place and while the fuel is being discharged.

Another object is to provide for the burning of the lighter end of oil fuel before top dead center of the piston, by causing these ends to be first thrown against the exhaust valve and ignited by heat stored in that valve so that the resulting pressure increase furnishes the additional heat necessary for rapid combustion of all the fuel and reverses the direction of air flow.

A still further object is to provide an arrangement whereby fuel lost from the fuel spray drips on the piston and not into the compression chamber.

Another object is to provide an arrangement of intake and exhaust valve, compression chamber and fuel injection nozzle, such that large intake and exhaust valves may be employed, whereby ample amounts of air are provided for high speed operation and complete scavenging of the compression chamber is obtained.

Other objects and advantages will become apparent from the following description and appended claims.

For the purpose of illustrating the genus of the invention, a typical concrete embodiment is shown in the accompanying drawing, in which.

Figure 1:
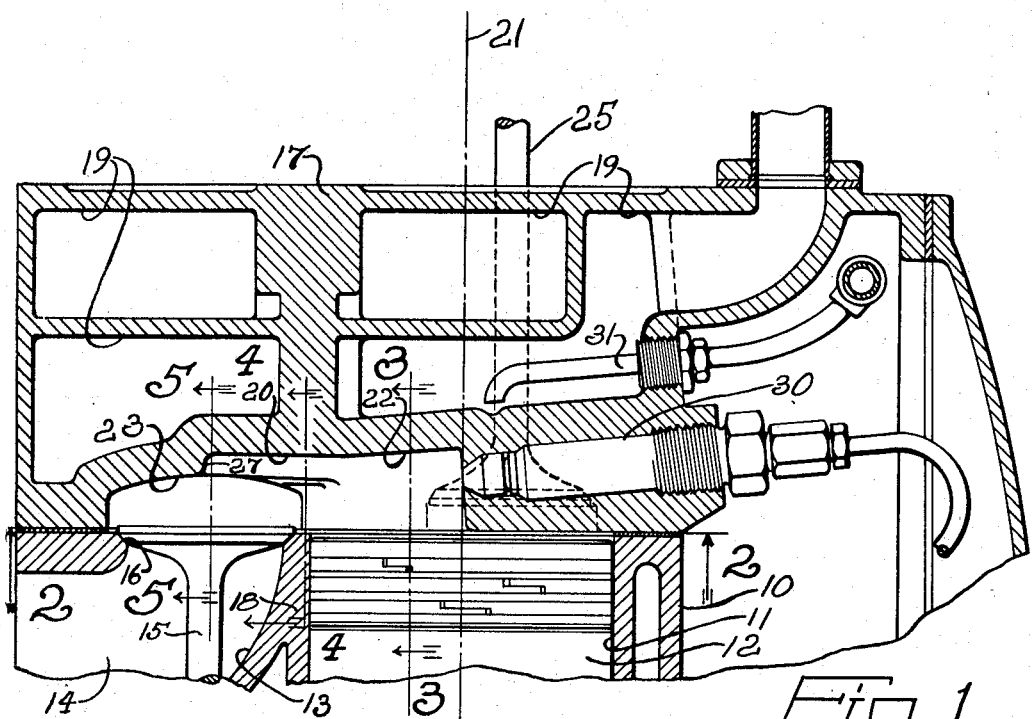
Figure 1 is a transverse section through a cylinder head and a portion of the cylinder block of an internal combustion engine, constructed in acccordance with the principles of this invention.
Figures 2, 3:
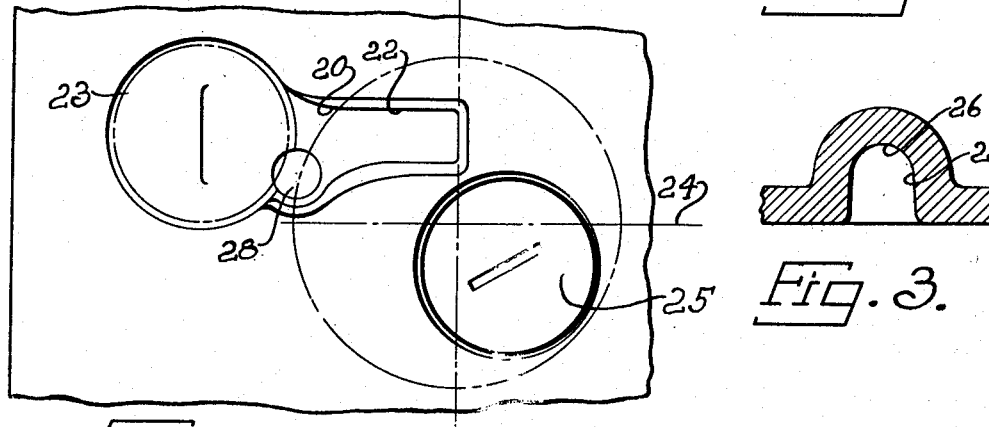
Fig. 2 is a bottom plan of a portion of the cylinder head, the view being taken as indicated by the line 2—2 of Fig. 1.
Figures 4, 5:
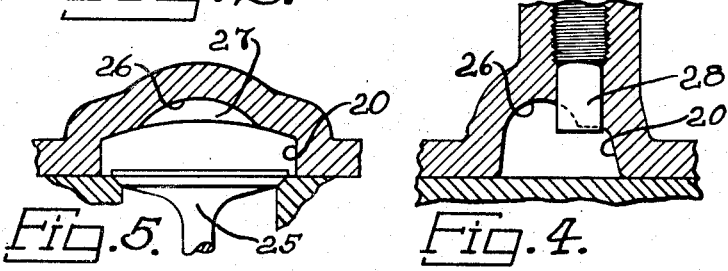

Figs. 3, 4 and 5 are sections taken on the line 3—3, 4—4 and 5—5 of Fig. 1.

Referring to the drawing, 10 designates the cylinder block of an internal combustion engine having a cylinder 11 in which is disposed a piston 12, illustrated at approximately top dead center position. While the drawing illustrates but one cylinder, it is to be understood that our invention is applicable to engines including any desired number of cylinders.

An exhaust passage 13 is provided in a lateral extension 14 of the cylinder block 10 and an exhaust valve 15 is arranged to move on a line parallel with the axis of the cylinder 11 to open or close the port 16 of the exhaust passage 13. A cylinder head 17 covers the cylinder block 10 and is constructed so as to provide passages 19 for a cooling fluid and a combustion chamber 20 above the cylinder and extending from the longitudinal center line of the engine, designated 21, across the head to include the exhaust valve 15. As illustrated in Figs. 1, 2, and 3, the portion of the compression chamber 20 disposed above the cylinder 11 is of comparatively small volume constituting a restricted passage or throat between the compression chamber 20 and the working portion of the cylinder 11. The lobe portion 23 of the combustion chamber 20 extends over the whole of the top of the exhaust valve 15 and constitutes the major portion of the compression chamber of which the exhaust valve 15 forms one side so that the major portion of the compression chamber is located outside the cylinder wall and above the exhaust valve. Otherwise the compression chamber 20 is located either aft or forward of the transverse centerline of the engine, designated 24, and in substantially tangential relationship with respect to the cylinder bore. This arrangement is provided to promote radial air swirl and to allow sufficient room for the air intake valve 25 located directly above the piston 12. Since the compression chamber 20 is located across the cylinder head 17, it is restricted in length, only by the width of the engine including the lateral extension 14, and consequently the compression chamber can be made comparatively long, thus permitting the employment of a long spray cone. The use of a long spray cone provides for a large area of contact between the injected fuel and air, and a more thorough breaking up of the injected fuel. The location of the exhaust valve 15 so as to constitute one of the walls of the compression chamber 20 and of the air intake valve 25 directly above the piston offers no restriction relative to the size of these valves so that a comparatively large intake valve 25 may be employed to assure ample air required in high speed performance of the engine, and a comparatively large exhaust valve may be employed to insure complete and direct scavenging of the compression chamber.

The present engine depends upon heat for effecting rapid combustion of the mixture of fuel and air. This heat may be obtained entirely by compression or by utilizing a combination of the residual heat of combustion and the heat of compression. The use of the heat of compression alone involves serious difficulties because in small bore engines the ratio of the water cooled surfaces to the volume displaced by the piston is such that the heat loss is great, thus requiring an excessive compression pressure to maintain a suitable temperature for rapid combustion. The present engine utilizes a combination of the residual heat of the combustion chamber or parts thereof and the heat of compression of the mixture of fuel and air. In the present instance the entire mixture is concentrated in the compression chamber directly over the exhaust valve 15 and contacts the chamber walls of which the exhaust valve 15 forms one side. The exhaust valve 15 is heated by the exhaust gases passing by the same so that it becomes a hot-spot in the compression chamber, and its heat is utilized for the purpose of intensifying the heat of compression.

In the development of the compression chamber 20, this chamber increases in cross-sectional area from the centerline 21 of the engine to the center of the exhaust valve where the area becomes maximum and the wall of the compression chamber opposite the piston 12 is of dome shape with its curvature gradually decreasing or flattening out from the longitudinal centerline of the engine to approximately the center of the exhaust valve 15. Thus the compression chamber, in shape, conforms closely to that of the spray cone pattern of the fuel injected into the compression chamber. The proper location of the fuel injection nozzle is essential, since upon its correct placement depends the successful accomplishment of results in accordance with the principles involved in the design of the compression chamber.

The fuel injection nozzle 30 is located at the inside end of the compression chamber 20 directly above the piston and in a position such that its spray cone is concentric with the chamber development. The injection nozzle 30 is arranged at a slight angle of inclination with respect to the face of the cylinder block so as to direct the injected fuel toward the hot exhaust valve 15. A separate conduit 31 may be provided to supply cooling fluid for the discharge end of the nozzle 30 from any desired source. Fuel injection begins just prior to the arrival of piston 12 at top dead center, at which time the air of compression is flowing from the piston, to the lobe portion 23 of the compression chamber 20 disposed above the exhaust valve 15, the air flowing with considerable turbulence and being restricted to travel in a direct line with the spray cone. The air and fuel traveling in the same direction over a comparatively long route and with a large area of contact, promotes a very thorough process of mixture. The lighter ends of the fuel and air naturally arrive at the exhaust valve first where they are immediately ignited by the heat stored in the exhaust valve which causes an increase in pressure and furnishes the additional heat necessary for rapid combustion and reverse flow of the air and fuel mixture.

The dome-shaped wall 26 of the compression chamber 20 terminates in a slight shoulder 27 at a point approximately above the center of the exhaust valve 15 to cause added turbulence of the air entering the lobe portion 23 of the compression chamber and to aid in directing the lighter ends of the injected fuel against the heated exhaust valve. A glow plug 28 of high electrical resistance may project into the compression chamber 20 for starting purposes. The glow plug may be heated from any suitable source of electrical energy.

The reversal of the direction of air flow causes added turbulence and the air moves in radial swirls due to the relative arrangement of the cylinder wall 18 and the compression chamber 20. As fuel is being injected during this period, a very complete mixture is formed and rapid combustion takes place. The location of the fuel injection nozzle 30 directly over the cylinder and with the discharge end of the nozzle opening into the small end of the compression chamber 20 causes the last drop of fuel injected into the cylinder to be exposed to ample air to give complete burning. During compression and while the fuel is being discharged across the piston toward the exhaust valve, the residual heat in the piston is transferred to the fuel. Since the lighter ends of the fuel are first thrown against the heated exhaust valve, combustion is initiated just prior to top dead center causing an increase in pressure and a rise in temperature which initiates the burning of the heavier end which sweeps back across the compression chamber cleaning the last drops of fuel from the discharge nozzle and thoroughly mixing these last drops with air to insure complete burning of the mixture. It is also noted that in the present arrangement any fuel lost from the spray drips upon the piston rather than remaining in the compression chamber. At the initiation of the discharge of fuel into the compression chamber the fuel and air flow in the same direction thus reducing opposition to the discharge of the fuel into the compression chamber. The arrangement of the exhaust valve as a wall of the combustion chamber reduces the flow of heat from the combustion chamber and thus reduces heat losses of the engine. In injecting the fuel into the compression chamber the fuel is not projected against cool walls so that complete and rapid burning of the fuel is insured.

As many changes could be made in the above construction and many apparently different embodiments of this invention could be made without departing from the scope thereof, it is intended that all matter contained in the above description or shown in the accompanying drawing shall be interpreted as illustrative and not in a limiting sense.

What is claimed is:

1. In an internal combustion engine, a cylinder block provided with an exhaust valve and a cylinder bore, the main portion of said exhaust valve being offset longitudinally of said cylinder block in one direction from the transverse center line of said cylinder bore, a cylinder head having an inlet valve, the main portion of said inlet valve being offset longitudinally of said head in an opposite direction from said center line of said cylinder bore, a compression chamber in said cylinder head having a main body portion registering with said exhaust valve and a communicating substantially narrow channel portion extending over said cylinder bore and overlapping the projection of said intake valve in a plane parallel to the plane of the head end of said block, said channel varying in curvature from a minimum radius of curvature at the cylinder end of the chamber to a maximum radius of curvature at the valve end of the chamber, and a fuel spray nozzle having an outlet at the cylinder end of said channel portion constructed and arranged to spray liquid fuel longitudinally of said chamber and to discharge substantially the main portion of the fuel charge directly upon said exhaust valve.

2. In an internal combustion engine, a cylinder block provided with a cylinder bore and an exhaust valve located at one side of said cylinder bore, a cylinder head having an inlet valve opening directly into the end of said cylinder bore, a compression chamber in said cylinder head having a cylindrical lobe slightly larger in diameter than said exhaust valve and substantially concentric therewith and having a communicating laterally tapered channel of less maximum width than the diameter of said lobe, said channel having a longitudinally extending arcuate groove in its roof varying in curvature from a minimum radius of curvature at the cylinder end of the chamber to a maximum radius of curvature at the valve end of the chamber, and a fuel spray nozzle having an outlet at the cylinder end of said channel constructed and arranged to discharge a fuel spray longitudinally of said chamber and having a pattern conforming to the arcuate groove of said channel roof.

GILBERT C. GOODE.
CLARENCE W. MILLER.
GEORGE R. HARRINGTON.